March 24, 1959  E. F. SCHWELLER  2,878,655
REFRIGERATING APPARATUS WITH CONDENSATE DIRECTOR
Filed Nov. 26, 1954
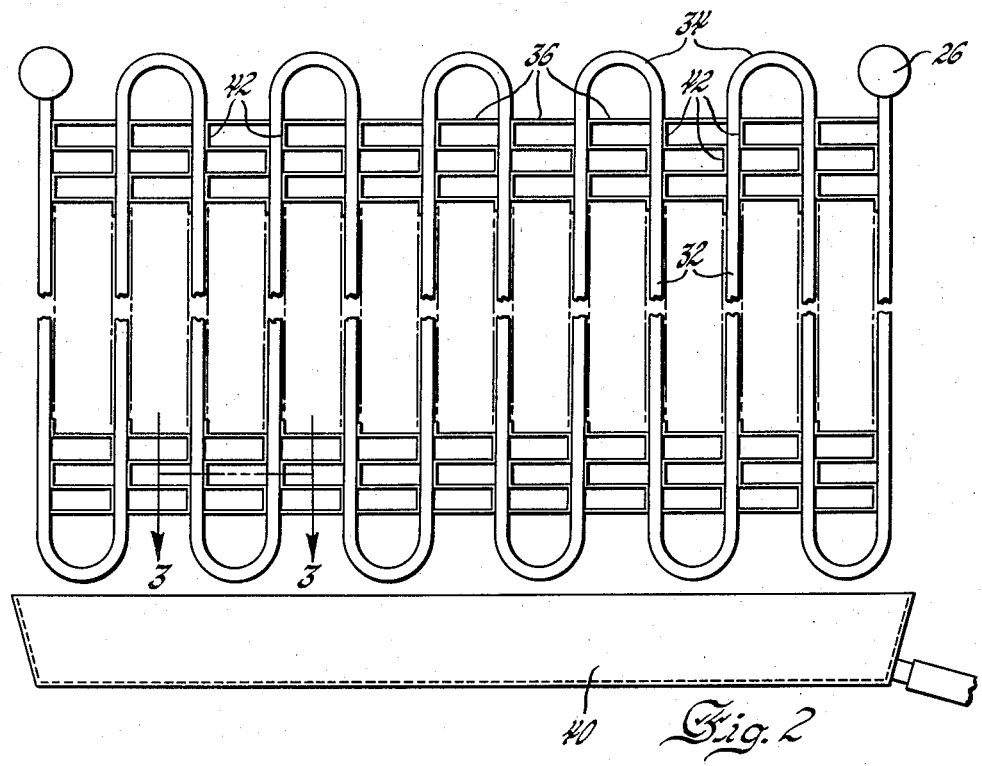
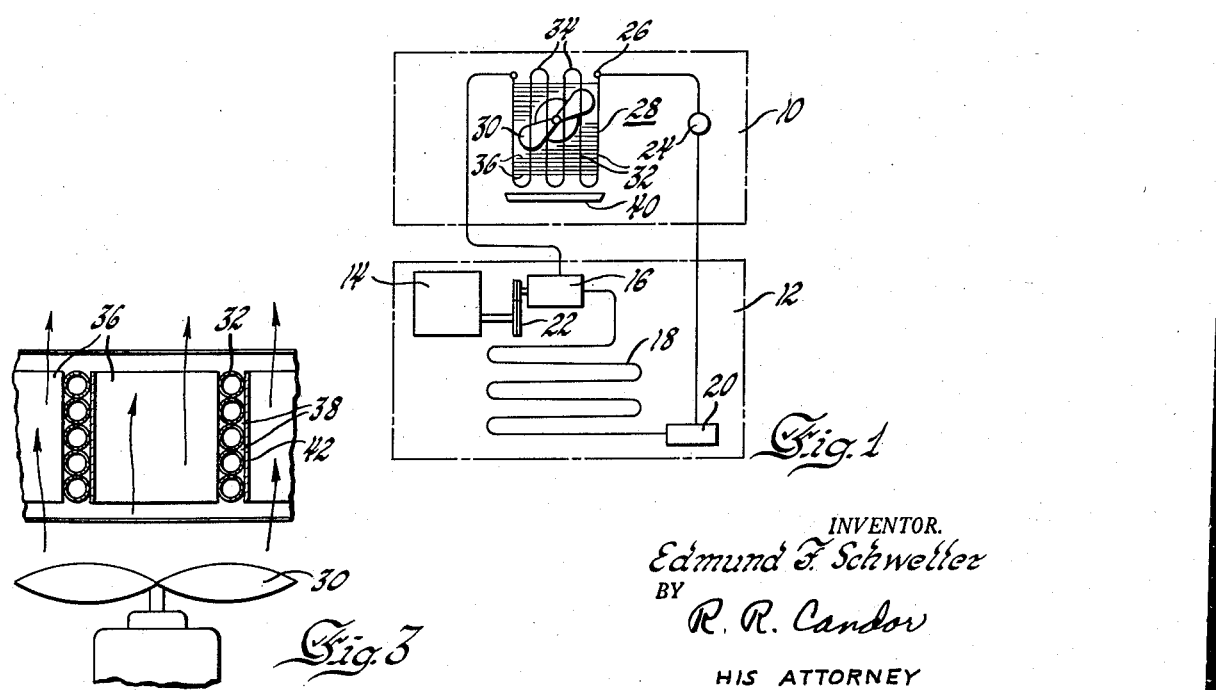
INVENTOR.
Edmund F. Schweller
BY
R. R. Candor
HIS ATTORNEY

United States Patent Office 2,878,655
Patented Mar. 24, 1959

2,878,655

REFRIGERATING APPARATUS WITH CONDENSATE DIRECTOR

Edmund F. Schweller, Dayton, Ohio, assignor to General Motors Corporation, Detroit, Mich., a corporation of Delaware Application November 26, 1954, Serial No. 471,320

3 Claims. (Cl. 62—285)

This invention relates to refrigerating apparatus and more particularly to an air conditioning system having improved means for preventing the accumulation of condensate on an evaporator.

One of the problems in designing an evaporator for use in air conditioning automobiles and the like is that of providing a maximum amount of heat transfer surface in a small space and at the same time preventing the condensate water from interfering with the efficient operation of the evaporator.

It is an object of this invention to provide an improved arrangement for draining the condensate from the evaporator so as to allow the use of closely spaced fins without trapping enough condensate water between the fins to block off portions of the air flow.

More particularly it is an object of this invention to provide an evaporator construction wherein the refrigerant passages of the evaporator are vertically disposed conduits located between horizontally disposed fins and wherein clearances are provided between the edges of the fins and the adjacent walls of the vertical refrigerant passages so as to allow the condensate to drain by gravity between the walls of the refrigerant passages and edges of the fins.

Further objects and advantages of the present invention will be apparent from the following description, reference being had to the accompanying drawings, wherein a preferred form of the present invention is clearly shown.

In the drawings:

Figure 1 is a diagrammatic view showing a refrigerating system embodying the invention and used in air conditioning an automobile;

Figure 2 is a side elevational view somewhat schematic showing the arrangement of the fins relative to the refrigerant passages; and, Figure 3 is a fragmentary sectional view taken substantially on line 3—3 of Figure 2.

Referring now to the drawing wherein a preferred embodiment of the invention has been shown, reference numeral 10 generally designates the passenger compartment of an automobile and the reference numeral 12 designates the engine compartment of the automobile wherein are located the main car engine 14, a refrigerant compressor 16, a condenser 18 and a receiver 20. The engine 14 not only supplies power for propelling the vehicle, but also supplies power for operating the compressor 16 through a belt drive 22. The parts thus far described are intended to represent the conventional refrigerant liquefying apparatus now used in standard automobile air conditioning systems.

The liquefied refrigerant flows from the receiver 20 through a conventional pressure reducing valve 24 from whence the refrigerant is supplied to the header 26 of an evaporator 28 which is arranged so as to cool air for the passenger compartment 10 of the car. The evaporator has been designed so as to occupy a minimum amount of space and can therefore be mounted under the instrument panel, on the fire wall, or in any other convenient location without occupying too much valuable space. Reference numeral 30 designates a conventional fan means for blowing air to be conditioned in thermal exchange relationship with the evaporator 28.

As best shown in Figures 2 and 3 of the drawing, the evaporator includes a plurality of vertically extending conduit portions 32 connected to one another by means of integrally formed return bends 34. In order to facilitate the transfer of heat from the air to the refrigerant flowing through the conduit portions 32, corrugated fin elements 36 have been provided between the adjacent vertical portions of the refrigerant conduits. In view of the fact that these fins and the refrigerant conduits are adapted to be operated at temperatures below the dew point temperature of the air to be conditioned, condensate will form on both the fins and the refrigerant conduits. Unless this condensate can freely drain away it will tend to collect in objectionably large quantities between the adjacent fin surfaces and thereby obstruct the flow of air through the air passages formed between the fins. This not only interferes with proper air circulation but also has a tendency to reduce the efficiency of the evaporator in that it reduces the effective surface of the evaporator.

As best shown in Figure 3 of the drawing, the refrigerant conduits consist of a plurality of parallel tubes which are brazed or otherwise secured to one another so as to form a unitary relatively flat multiple passage conduit having corrugated or grooved side walls. By virtue of this construction, condensate drainage clearances or channels 38 are provided between the edges of the fins and the grooved portions of the refrigerant conduits so as to provide for gravity drainage of the condensate downwardly along the side walls of the refrigerant conduits. The condensate flowing downwardly through the channels or grooves 38 is out of the path of the main air blast and will freely drain into the usual condensate collecting pan 40 located beneath the evaporator. The flat edges 42 of the corrugated fins are in direct physical contact with the projecting portions of the conduits 32 and are brazed thereto so as to form a rigid assembly.

While the form of embodiment of the invention as herein disclosed constitutes a preferred form, it is to be understood that other forms might be adopted, as may come within the scope of the claims which follow.

What is claimed is as follows:

1. An evaporator for use in cooling and drying air comprising a plurality of vertically extending refrigerant flow conduit means, vertically disposed fin means having the edges thereof arranged in contacting relationship to portions of said vertically extending conduit means, fan means for circulating air in a horizontal direction through the air passages formed between adjacent fin means and adjacent conduit means, said conduit means and said fins being spaced from one another at spaced points along the edges of said fins so as to form vertically extending condensate drainage clearances between the edges of said fins and the side walls of said conduit means.

2. In a heat exchanger for use in cooling air and removing moisture therefrom, a plurality of vertically extending substantially circular refrigerant conduits arranged in side-by-side relationship to one another, vertically disposed fin means secured to the opposite sides of said conduits, the edges of said fin means being tangent to said circular conduits so as to form condensate flow passages between the edges of said fins and portions of the side walls of said tubes, and fan means for circulating air horizontally in thermal exchange relationship with said conduits and said fin means, said fin means comprising corrugated strips of metal disposed between adjacent vertically extending conduits.

3. In a heat exchanger for use in cooling air and removing moisture therefrom without the formation of frost, a plurality of vertically extending refrigerant conduits, vertically disposed fin means secured to the opposite sides of said conduits, the edges of said fin means being spaced from said conduits at spaced points so as to form condensate flow passages between the edges of said fins and portions of the side walls of said conduits, and fan means for circulating air horizontally in thermal exchange relationship with said conduits and said fin means.

References Cited in the file of this patent

UNITED STATES PATENTS

| | | |
|---|---|---|
| 1,688,885 | Spreen | Oct. 23, 1928 |
| 1,823,004 | Replogle | Sept. 15, 1931 |
| 1,923,170 | Slagel | Aug. 22, 1933 |
| 2,056,862 | Markley | Oct. 6, 1936 |
| 2,063,757 | Saunders | Dec. 8, 1936 |
| 2,093,725 | Hull | Sept. 21, 1937 |
| 2,144,248 | Vancott | Jan. 17, 1939 |
| 2,294,036 | Kettering | Aug. 25, 1942 |
| 2,442,719 | Booth | June 1, 1948 |